(12) United States Patent
Muhl et al.

(10) Patent No.: US 7,216,391 B2
(45) Date of Patent: May 15, 2007

(54) CONSTANT RADIUS DOCK LEVELER HINGE

(75) Inventors: Timothy Muhl, Slinger, WI (US); Brian Bender, deceased, late of Brookfield, WI (US); by Lisa Bender, legal representative, Kenosha, WI (US); Mike Jehn, Waukesha, WI (US); Pamela Pietrangelo, Oak Creek, WI (US); Michael Mitchell, Milwaukee, WI (US); Matthew Tourdot, West Bend, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 10/739,791

(22) Filed: Dec. 18, 2003

(65) Prior Publication Data

US 2005/0132512 A1   Jun. 23, 2005

(51) Int. Cl.
*E01D 1/00* (2006.01)
*E01D 15/00* (2006.01)

(52) U.S. Cl. .......................... 14/71.1; 14/69.5; 14/71.3

(58) Field of Classification Search ......... 14/69.5–72.5
See application file for complete search history.

(56) References Cited

U.S. PATENT DOCUMENTS

| | | | |
|---|---|---|---|
| 1,993,261 A | 3/1935 | Colgate | |
| 2,751,615 A | 6/1956 | Kelley | |
| 2,843,865 A | 7/1958 | Loomis et al. | |
| 2,881,457 A | 4/1959 | Rogers | |
| 2,972,762 A | 2/1961 | McConica | |
| 2,994,894 A | 8/1961 | Loomis et al. | |
| 3,137,876 A | 6/1964 | Loomis | |
| 3,235,895 A | 2/1966 | Wallace et al. | |
| 3,249,956 A | 5/1966 | Zajac et al. | |
| 3,308,497 A | 3/1967 | Lambert | |
| 3,424,323 A | 1/1969 | Barnaby | |
| 3,587,126 A | 6/1971 | Potter | |
| 3,840,930 A | 10/1974 | Wanndell | |
| 3,872,948 A | 3/1975 | Richards | |
| 4,020,517 A | 5/1977 | Waddell | |

(Continued)

FOREIGN PATENT DOCUMENTS

DE    2852888 A1 *  8/1980

(Continued)

OTHER PUBLICATIONS

European Patent Office, *European Search Report*, Mar. 18, 2005, 14 pages.

(Continued)

*Primary Examiner*—Raymond Addie
(74) *Attorney, Agent, or Firm*—Hanley Flight & Zimmerman, LLC (57) ABSTRACT

A dock leveling system adapted to be disposed in a pit is disclosed. A hinge member with a hinge pin receiving area and a hinge pin disposed in the hinge member defines a center of rotation. A deck that is rotatable about the hinge pin includes a curved portion with a constant radius and a center of curvature substantially similar to the center of the hinge pin. The curved portion defines an elevation that remains constant as the deck rotates about the hinge pin.

38 Claims, 7 Drawing Sheets

U.S. PATENT DOCUMENTS

| | | | |
|---|---|---|---|
| 4,065,824 A * | 1/1978 | Ellis et al. ................... 14/71.3 |
| 4,142,640 A | 3/1979 | Kummerman |
| 4,155,468 A | 5/1979 | Royce |
| 4,169,296 A | 10/1979 | Wipkink et al. |
| 4,257,137 A | 3/1981 | Hipp et al. |
| 4,354,771 A * | 10/1982 | Dickinson ..................... 404/6 |
| 4,455,703 A | 6/1984 | Fromme et al. |
| 4,718,136 A | 1/1988 | Fisher et al. |
| 4,865,507 A * | 9/1989 | Trickle ....................... 414/401 |
| 5,097,557 A * | 3/1992 | Salman et al. ................ 14/71.1 |
| 5,214,818 A * | 6/1993 | Cook ........................... 14/71.1 |
| 5,343,583 A | 9/1994 | Cook |
| 5,522,108 A * | 6/1996 | Massey et al. ............... 14/71.7 |
| 5,781,953 A | 7/1998 | Winter |
| 5,815,871 A | 10/1998 | Borchardt |
| 6,112,353 A * | 9/2000 | Winter ........................ 14/71.3 |
| 6,163,913 A * | 12/2000 | DiSieno et al. .............. 14/71.3 |
| 6,360,393 B1 * | 3/2002 | Fritz ........................... 14/69.5 |
| 6,370,719 B1 | 4/2002 | Alexander |
| 6,460,212 B2 | 10/2002 | Massey et al. |
| 6,487,741 B2 * | 12/2002 | Alexander ................... 14/71.3 |
| 6,634,049 B2 * | 10/2003 | Hahn et al. ................... 14/71.1 |
| 6,654,976 B2 * | 12/2003 | Digmann et al. ............ 14/69.5 |

FOREIGN PATENT DOCUMENTS

| | | |
|---|---|---|
| DE | 30 18 932 | 11/1981 |
| DE | 34 07 496.1 | 9/1984 |
| DE | 3407 496 | 9/1984 |
| DE | 296 18 180 | 4/1997 |
| EP | 0 183 126 | 11/1985 |
| EP | 0 601 176 | 12/1996 |
| GB | 1048557 | 8/1963 |
| GB | 1049759 | 11/1963 |

OTHER PUBLICATIONS

Rite Hite Corporation, *Owners Manual Installation-Operation-Service-Parts For EOD 400 Series Mechanical Dock Leveler*, Mar. 1981, 3 pages.

Rite Hite Corporation, *Parts Manual for Hinged Dock Leveler Model HL56*, 4 pages.

Gottfried, Reymann, English translation of German Patent No. DE2852888A1 issued Aug. 14, 1980 for "Überfahrbrücke für Rampen".

* cited by examiner

CONSTANT RADIUS DOCK LEVELER HINGE

FIELD OF THE DISCLOSURE

The present disclosure relates to a dock leveler system, and more specifically to a rear hinge section of a dock leveler with a constant radius.

BACKGROUND OF THE DISCLOSURE

Dock levelers are often used to compensate for a height difference that can exist between a loading surface of a loading dock and the bed of a truck parked at the dock. A dock leveler system typically is mounted in a pit cut into the loading dock and includes a deck that is hinged at its back end to raise or lower the distal front end to generally match the height of the truck bed. A gap generally exists between the truck bed and the loading dock when the truck has backed up and is ready to be loaded or unloaded. An extension plate or lip can be pivotally coupled to the front end of the deck to bridge the gap. The deck and extended lip provide a path for a forklift truck or the like to travel from the loading dock onto the truck bed, thus facilitating loading or unloading of the truck.

If the bed of the truck is substantially at the same height as the floor of the loading dock, the deck elevation remains near a cross-traffic position. If the bed of the truck is higher than the loading dock floor, the deck can be rotated upward into an above dock position. It the bed of the truck is lower than the loading dock floor, the deck can be rotated into a below dock position. The deck can be used within a truck service range which is generally defined as a ±10% grade (or ±6° angularity).

Figure 1:
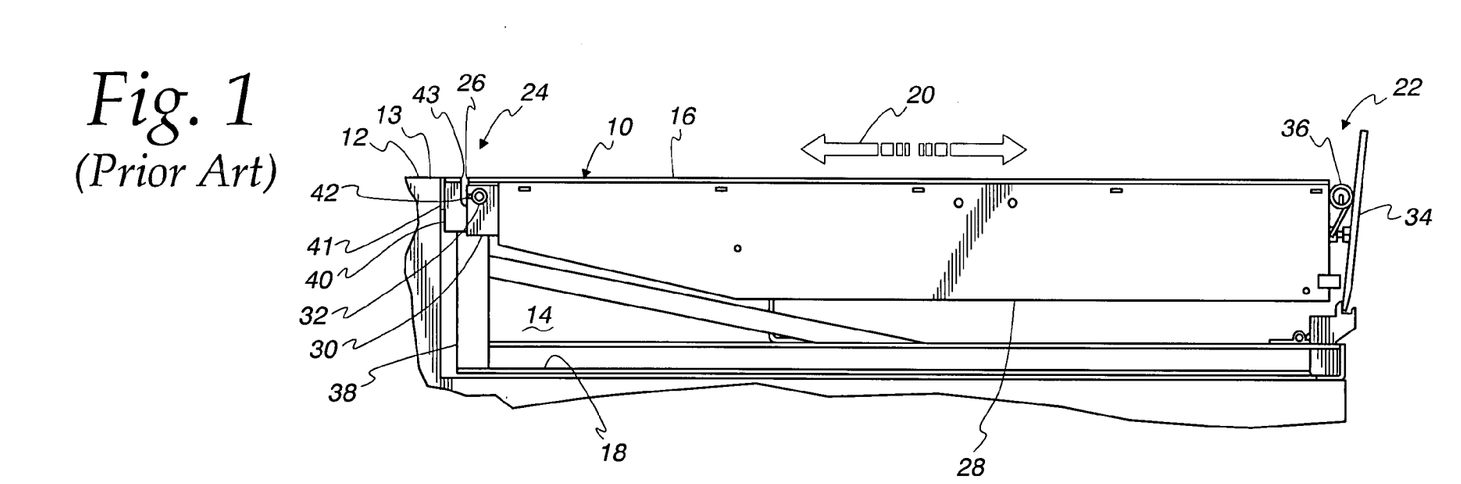
FIG. 1 is a cross sectional side view of a prior art dock leveling system in the cross traffic position

As can be seen in FIG. 1, a typical dock leveling system 10 is shown in a stored position in a loading dock 12 of a building. In the stored position, also known as the cross-traffic position, the dock leveling system 10 is flush with the surrounding loading dock floor 13. The dock leveling system 10 is disposed in a pit 14 cut into the loading dock 12 and includes a deck 16 and a frame structure 18. The dock leveling system 10 defines a path indicated by arrows 20 that a forklift travels from the loading dock 12 into a truck to be loaded or unloaded. The deck 16 has a front end 22 and a back end 24, and the back end 24 defines a back edge 26 that extends the width of the deck 16. The deck 16 is strengthened by a plurality of stringers 28 that are approximately parallel to each other and run lengthwise from the front end 22 of the deck 16 to the back end 24. Extending downward from the back end 24 of the deck 16 are a plurality of extension members 30, each of which include a receiving hole 32. A deck 16 typically includes at least two pairs of extension members 30.

A lip 34 is connected to the front end 22 of the deck 16 by a lip hinge 36. The lip 34 is rotatable from a pendant position shown in FIG. 1 in which the lip 34 hangs downward, to an extended position in which the lip 34 extends substantially coplanar to the deck 16 and is able span the gap between the loading dock 12 and the bed of a truck to be unloaded.

The frame structure 18 includes a plurality of vertical uprights 38 upon each of which are disposed hinge members 40. The number of vertical uprights 38 generally corresponds to the number of pairs of extension members 30. Each hinge member 40 includes a hinge pin 42 disposed therethrough. Each hinge pin 42 also extends through a respective receiving hole 32 of one of the plurality of extension members 30, thereby rotatably connecting the deck 16 to the frame structure 18.

An upper member 41 is disposed on the hinge members 40. The upper member 41 can be a piece of angle iron and extend the entire width of the dock loading system 10. the upper member 41 includes a leading edge 43 opposite the back edge 26 of the deck 16.

Figure 2:
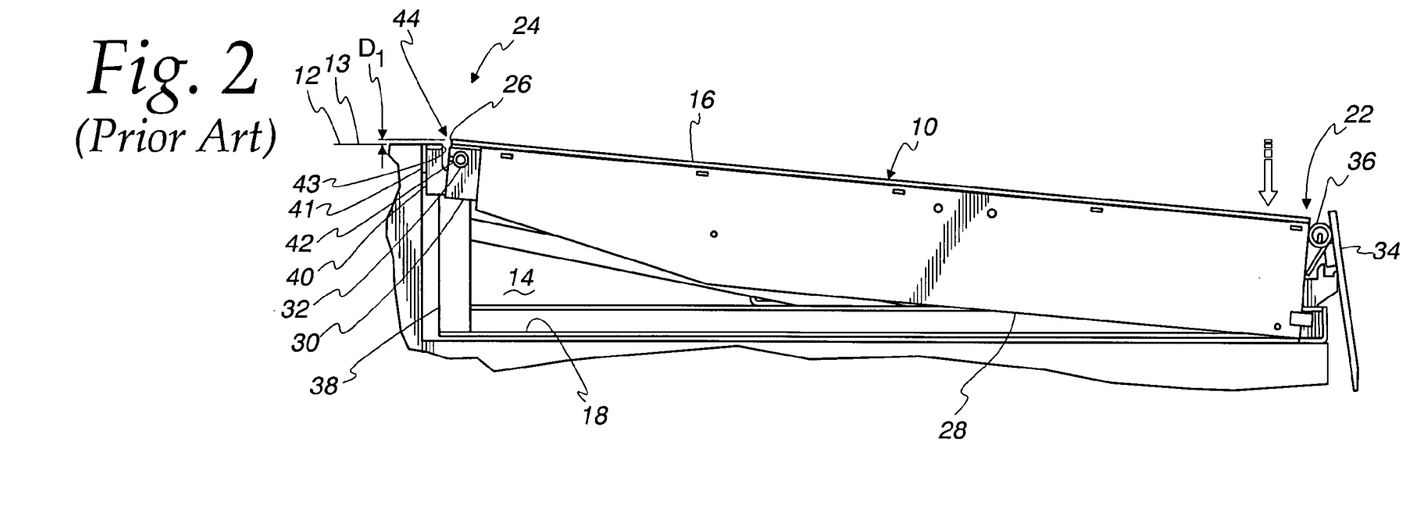
FIG. 2 is a cross sectional side view of the dock leveling system of FIG. 1 in the below dock position.

Referring now to FIG. 2, the deck 16 is shown in the below-dock position. In this position, the deck 16 has been rotated about the hinge pins 42 so that the front end 22 of the deck 16 is lower than the back end 24. It is necessary to place the deck 16 in this position when the bed of a truck to be loaded or unloaded is lower than the floor of the loading dock 12.

As can be seen in FIG. 2, the back edge 26 of the back end 24 of the deck 16 extends rearwardly of the center of the hinge pins 42. Thus, when the front end 22 of the deck 16 is lowered, the back end 24 of the deck 16 is raised up a distance D1, thereby exposing the back edge 26 and creating an above dock floor projection 44 in the path 20 of a forklift traveling from the dock floor to the bed of a truck. Traveling over the projection 44 can be an annoyance to the driver of the forklift due to the amount of times the driver must enter and depart the truck in loading. The projection 44 can also cause damage to the wheels of the forklift. Furthermore, if a user is wheeling a hand truck into and out of the truck bed, the projection 44 can be difficult to overcome and cause jostling of the boxes being moved. In other situations, operators may be sliding skids along the ground into the truck. If an operator slides a skid into the exposed back edge 26, the skid cannot ride over the projection 44, and the skid can get damaged. This repeated impact can lead to damage of the rear hinge 40 of the dock leveling system 10.

Figure 3:
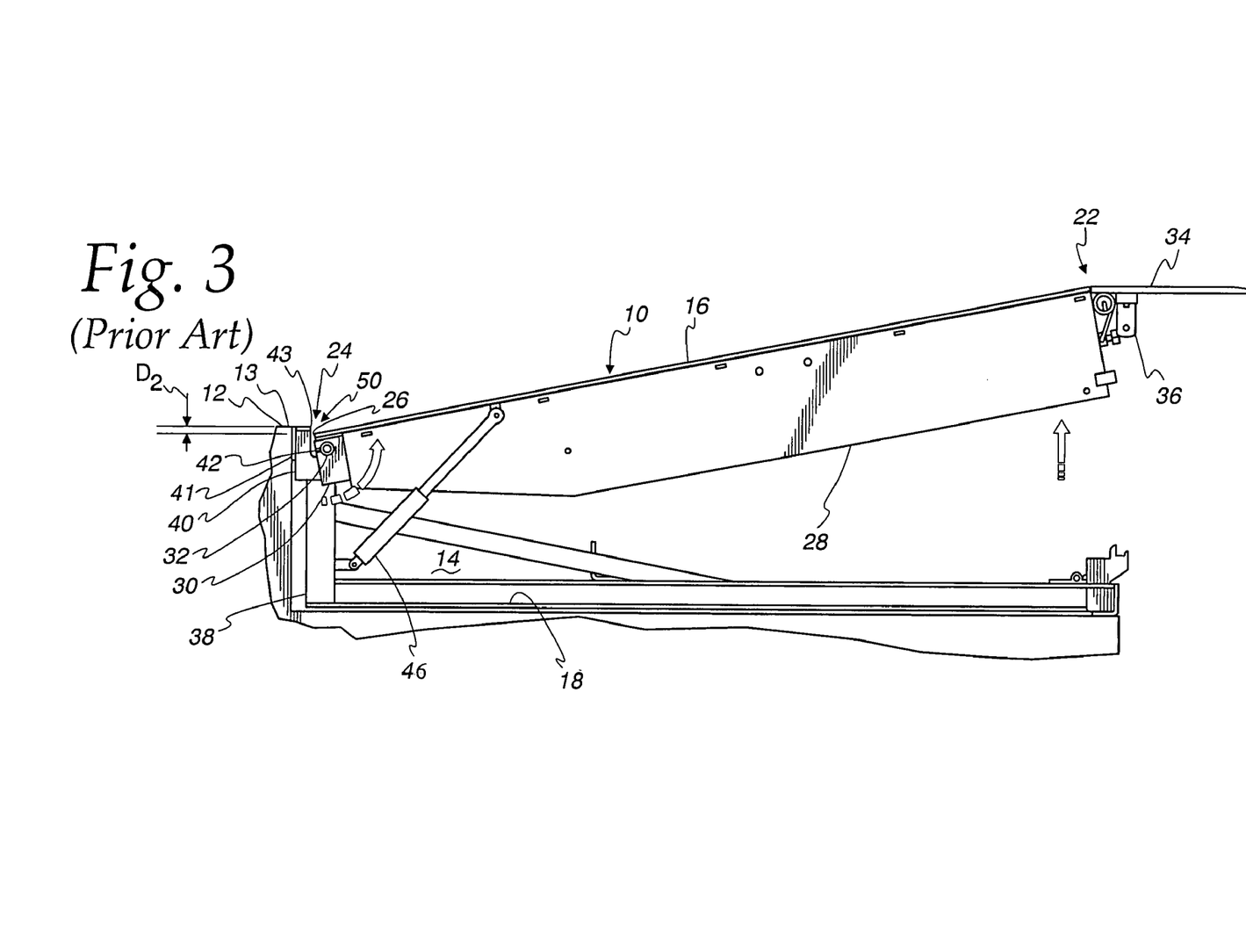
FIG. 3 is a cross sectional side view of second prior art dock leveling system in the above dock position.

Referring now to FIG. 3, the deck 16 is depicted in the above-dock position. In this example, the deck 16 can accommodate a truck that has a bed that is higher than the floor 13 of the loading dock 12. The deck 16 must then be rotated about the hinge pins 42 such that the front end 22 of the deck 16 is raised above the level of the bed of the truck. In this example, a hydraulic cylinder 46 is shown that can aid in the lifting and/or lowering of the deck 16.

Again, because the back edge 26 of the deck 16 extends rearwardly of the center of the hinge pins 42, when the front end 22 of the deck 16 is rotated upward, the back edge 26 is rotated down a distance D2, thus exposing the leading edge 43 of the upper member 41 of frame structure 18 and creating an above-deck projection 50 in the path 20 of the forklift. Again, when forklifts or skids exit towards the loading dock 12, they impact the exposed leading edge 43 of the upper member 41, possibly causing damage to the forklift wheels or the skids.

Assuming that there is no projection when the dock leveling system 10 is in the stored position, the prior art has attempted to reduce the projection 44 in the below dock position by changing the position of hinge members 40. If the hinge members 40 are lowered, the distance D1 will be lessened, and the projection 44 will be minimized. However, this will only exacerbate the projection 50 when the deck 16 is in the above-dock position. Because the hinge members 40 are lowered, when the deck 16 is in the above-dock position the distance D2 will be increased by the amount the hinge members 40 are lowered. The converse is also true in that if the hinge members 40 are raised, the projection 50 will be minimized in the above-dock position, but the projection 44 will be increased in the below dock position. Either approach does not produce a satisfactory solution.

For certain repairs to this type of dock leveler 10, the deck 16 can be rotated upward so that a technician can enter the pit 14 under the deck 16 and remove each of the individual hinge pins 42 from the extension members 30. In this manner, the deck 16 can be removed from the frame structure 18 to provide greater accessibility if required.

Figure 4:
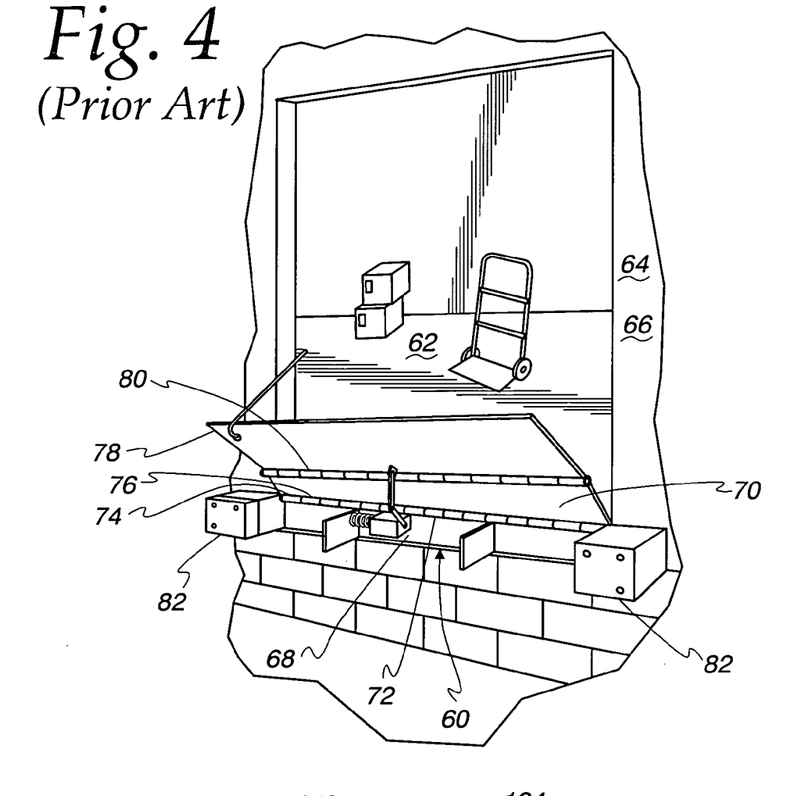
FIG. 4 is a perspective view of an edge of dock prior art dock leveling system.

Another type of known dock leveling system, known as a Edge-of-Dock Leveler, or EOD, is depicted as structure 60 in FIG. 4. The EOD 60, described fully in U.S. Pat. No. 4,257,137, is fastened adjacent a loading dock 62 to the outside wall 64 of a building 66. The EOD 60 includes a mounting plate 68 fastened to the outside wall 64. The mounting plate 68 is connected to a deck 70 by a first piano hinge 72. In the piano hinge 72, as is known, a series of short tubes 74 extend from the top of the mounting plate 68 and are interengaged with a complementary series of short tubes 76 extending from the deck 70. The interengaged short tubes 74, 76 define a hollow tube that extends the width of the EOD 60. A rod (not shown) extends through the interengaged short tubes 74, 76 the width of the EOD 60 to define the first piano hinge 72. A lip plate 78 is connected to the deck 70 by a second piano hinge 80.

Extending outward from the building 66 on either side of the EOD 60 is a pair of bumper blocks 82. The bumper blocks 82 protect the building 66 from a truck that is backing up to the loading dock 62. The deck 70 and lip plate 78 are sized such that when the truck backs against the bumper blocks 82, the lip plate 78 can extend out into the bed of the truck.

In this situation, the first piano hinge 72 does not create a projection in the path of a forklift when the forklift is traveling into or out of the truck. However, due to the piano hinge construction and the bumper blocks 82 being placed on either side of the first piano hinge 72, the rod inside the first piano hinge 72 cannot be removed. Accordingly, the deck 70 cannot easily be removed to be perform certain repairs or replacement.

Accordingly, it would be beneficial to provide a dock leveling system that does not create a projection in the path of a forklift, and further provides an easily removable deck for repair or replacement purposes.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION

Figure 5:
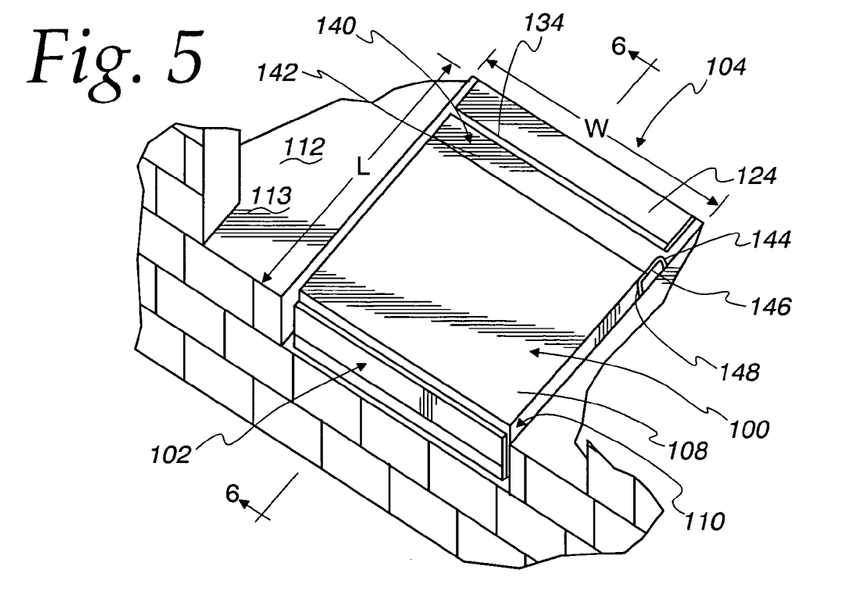
FIG. 5 is perspective view of a dock leveling system in the cross traffic constructed in accordance with the teachings of this disclosure.
Figure 6:
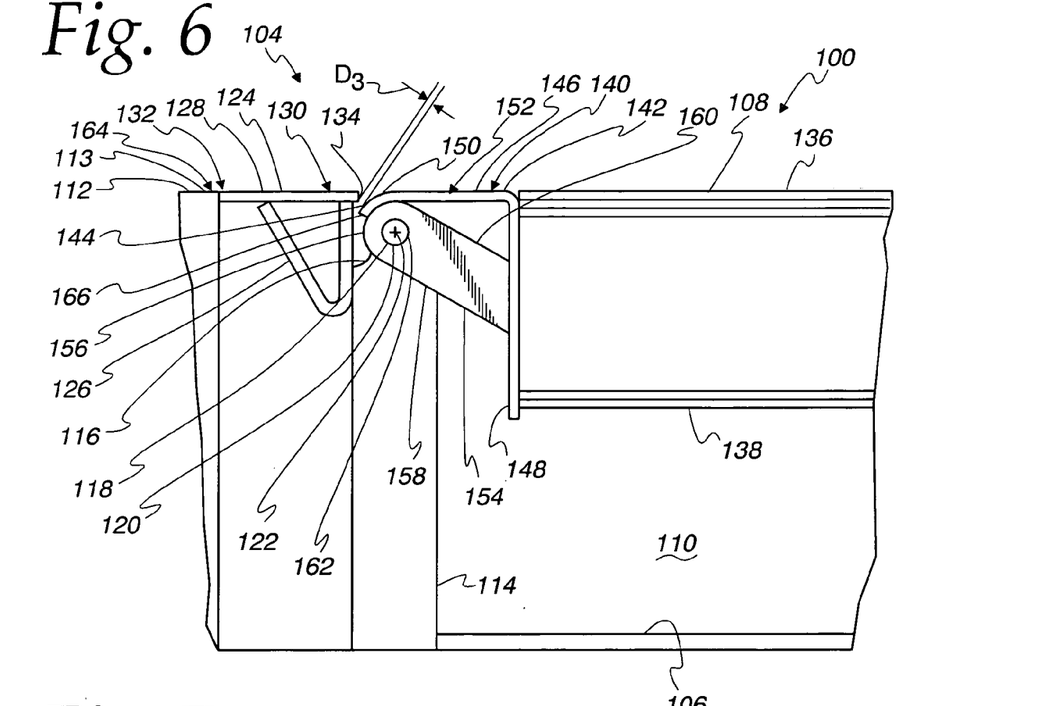
FIG. 6 is a partial cross sectional view of the dock leveling system of FIG. 5 taken along line 6—6.
Figure 7:
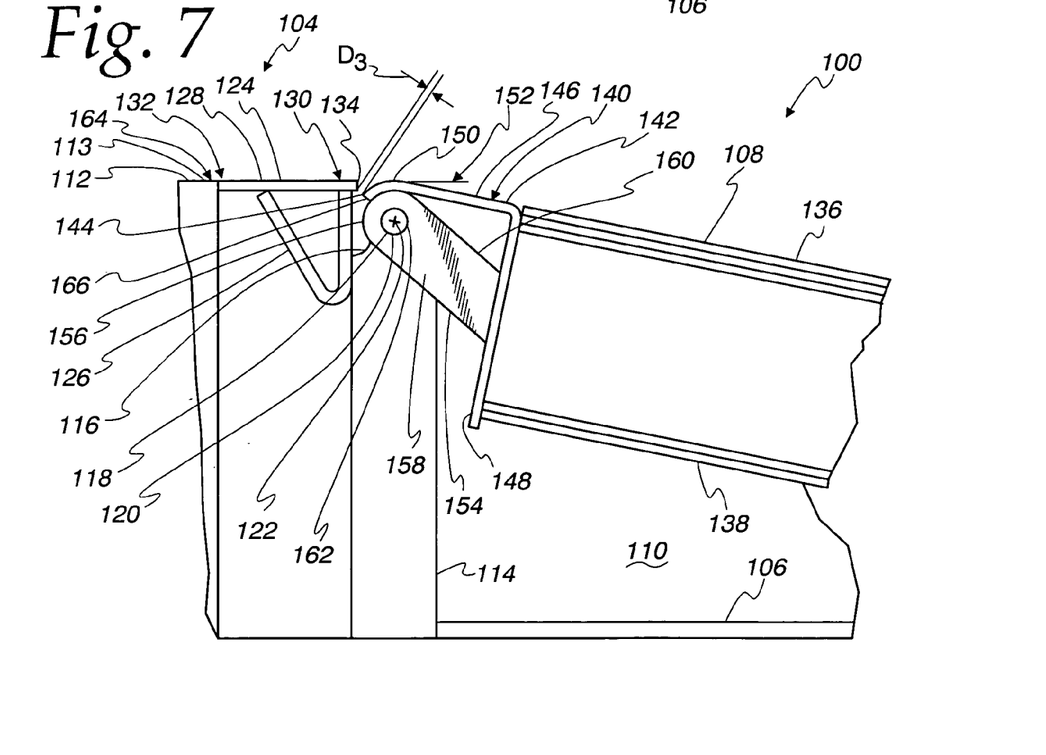
FIG. 7 is a partial cross sectional view of the dock leveling system of FIG. 5 taken along line 6—6 in the below dock position.
Figure 8:
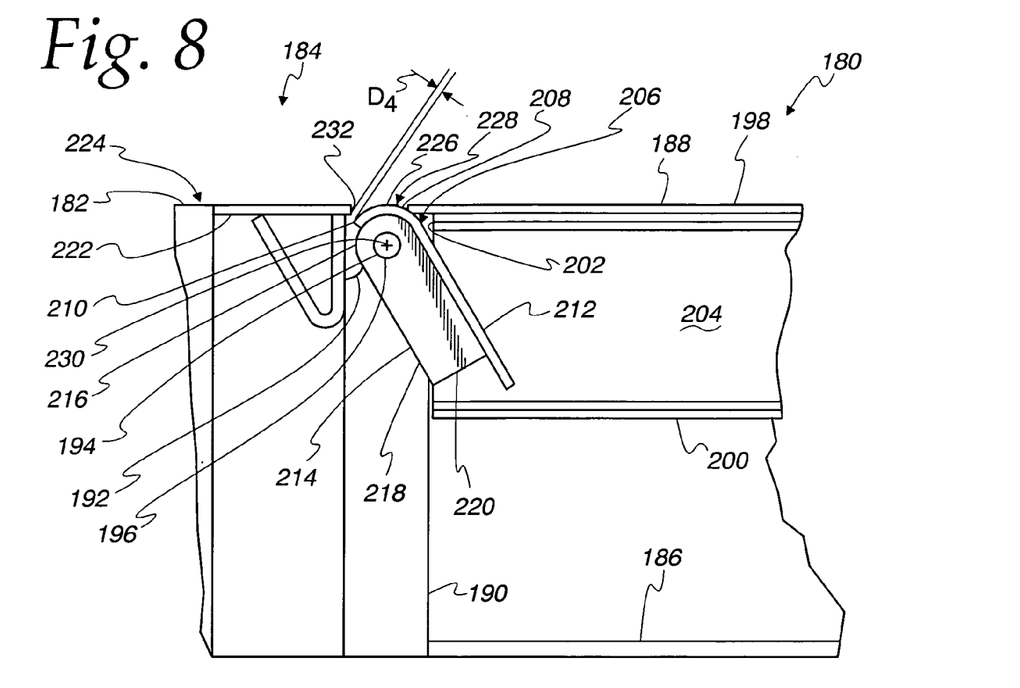
FIG. 8 is a partial cross sectional view of a second example of a dock leveling system constructed in accordance with the teachings of this disclosure.
Figure 9:
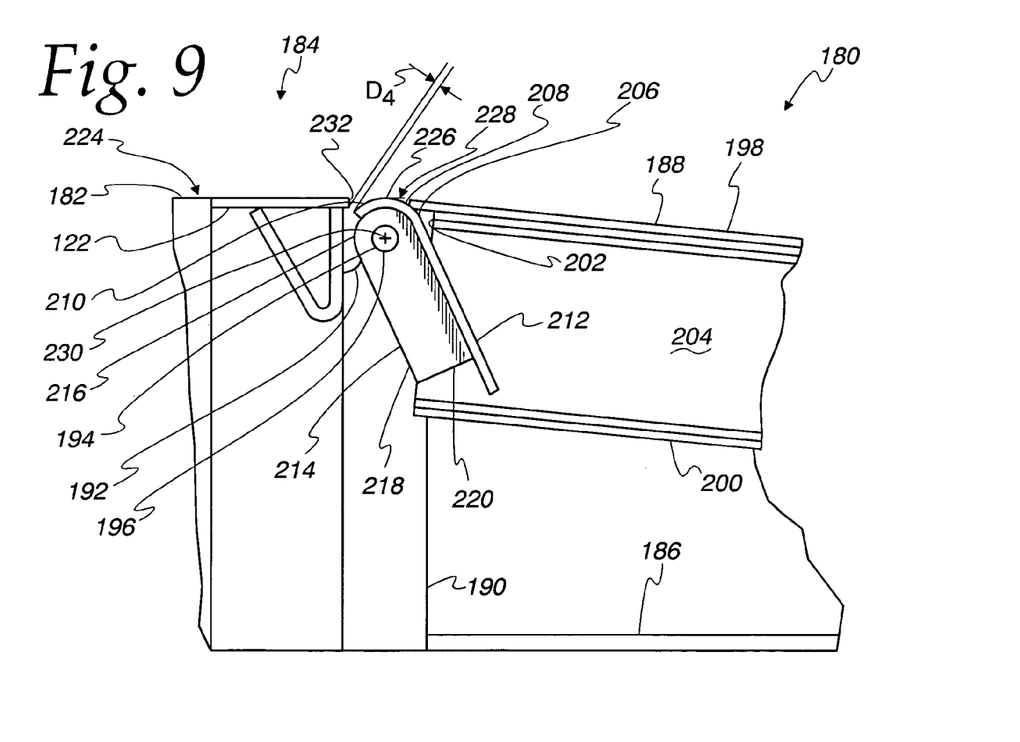
FIG. 9 is a partial cross sectional view of the second example of the dock leveling system in the below dock position.
Figure 10:
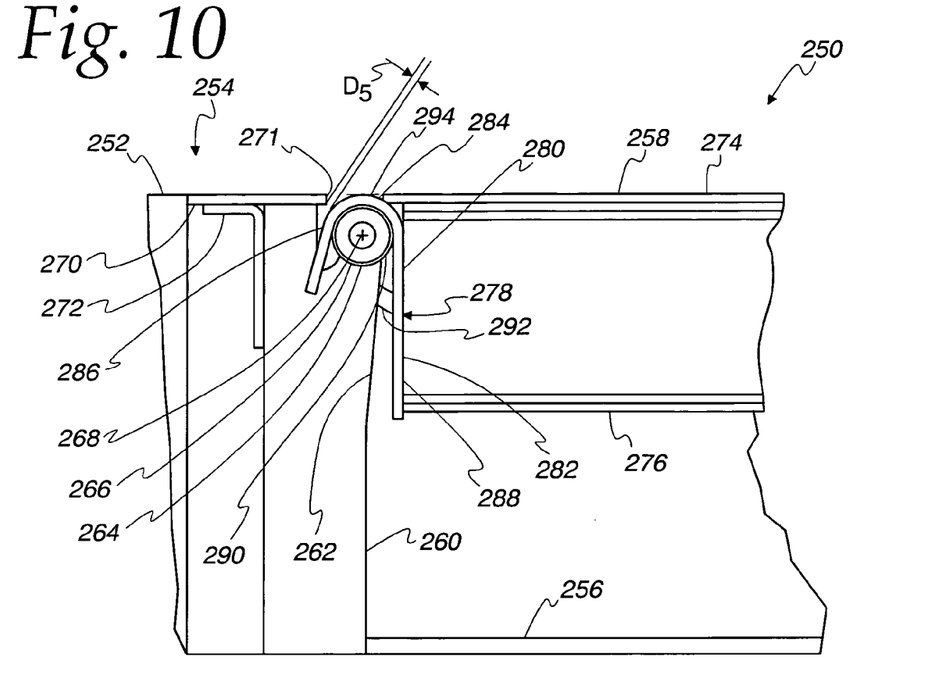
FIG. 10 is a partial cross sectional view of a third example of a dock leveling system constructed in accordance with the teachings of this disclosure.
Figure 11:
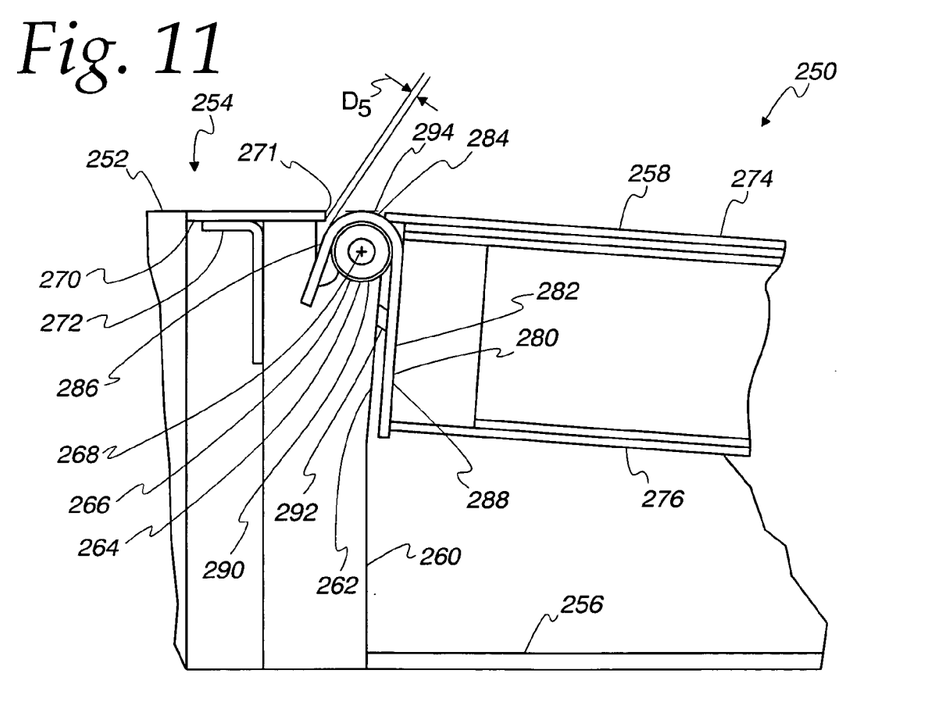
FIG. 11 is a partial cross sectional view of the third example of the dock leveling system in the below dock position.
Figure 12:
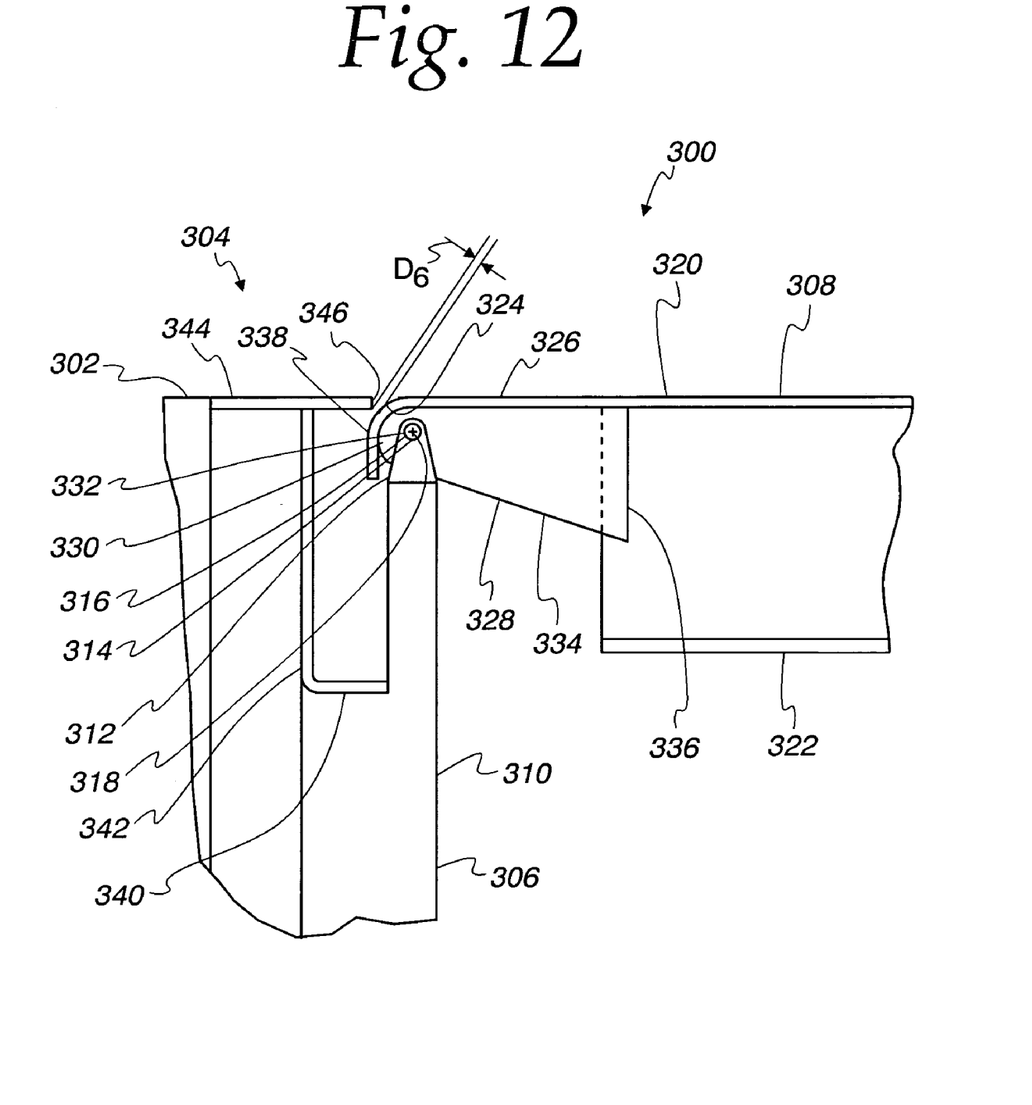
FIG. 12 is a partial cross sectional view of a fourth example of a dock leveling system constructed in accordance with the teachings of this disclosure.

Referring now to the drawings, four examples of a constant radius hinge assembly for a dock leveling system that provides a smooth transition between the loading dock and the deck are depicted. The first example is designated by the reference numeral 140 and is shown in FIGS. 5, 6, and 7. The second example is designated by the reference numeral 206 and is shown in FIGS. 8 and 9. The third example is designated by the reference numeral 278 and is shown in FIGS. 10 and 11. Finally, the fourth example is designated by the reference numeral 338 and is shown in FIG. 12. Other examples are certainly possible and within the scope of this disclosure.

Referring now to FIGS. 5, 6, and 7, a first example of a dock leveling system 100 is disclosed. The dock leveling system 100 includes a front side 102 and a back side 104 and has an overall length L and an overall width W. The front side 102 can be similar to prior art dock leveling systems. The dock leveling system 100 includes a frame structure 106 and a deck 108 rotatably mounted to the frame structure 106. The dock leveling system 100 is disposed in a pit 110 cut into a loading dock 112 of a building. The loading dock 112 has a dock floor 113.

FIG. 6 depicts the dock leveling system 100 in the cross-traffic position, while FIG. 7 depicts the dock leveling system 100 in the below dock position. The frame structure 106 includes a plurality of vertical uprights 114 extending upward from the base of the pit 110, only one of the vertical uprights 114 being shown in FIGS. 6 and 7. In one example, four vertical uprights 114 are spaced across the width W of the pit 110, but more or less vertical uprights 114 can be used depending on the width W of the dock leveling system 100 or its expected application. On the top of each vertical upright 114 is a hinge member 116. In this example, each hinge member 116 is a camel-back shaped portion of the vertical upright 114 and includes a receiving hole 118 (seen best in FIG. 12). A hinge pin 120 is rotatably disposed in each of the receiving holes 118 of the hinge members 116. Thus, a total of four individual hinge pins 120 are used in this example. The hinge pins 120 define a center of rotation 122 for the deck 108 about the frame structure 106.

Disposed to the rear of the vertical uprights 114 is a rear transition 124. The rear transition 124 can extend the full width W of the dock leveling system 100 and may serve as a point of attachment of the frame structure 106 to the dock floor 113. The rear transition 124, in the depicted example, includes a V-support 126 and a plate 128. The V-support 126 can be welded to the vertical uprights 114 and provides support for the plate 128.

The plate 128 provides a surface for a forklift to traverse. The plate 128 includes a front section 130 and a rear section 132. The front section 130 is directly supported by the V-support 126 and includes a front edge 134.

The rear section 132 is cantilevered out from the V-support 126. The rear section 132 can be cut and trimmed during installation of the dock leveling system 100. In some instances, the pit 110 may be cut too short or may be out of square or alignment. In this instance, the rear section 132 can be cut and trimmed on site such that the entire dock leveling system 100 can fit properly into the pit 110. In other examples, the rear transition 124 can be omitted, and the vertical uprights 114 can be disposed and attached against the wall of the pit 110.

The deck 108 includes a plate 136 that can extend the entire width W of the dock leveling system 100. The plate 136 provides the main surface on which a forklift may travel between the loading dock 112 and a truck.

The deck 108 also includes a plurality of stringers 138 extending downward from the plate 136. In a typical example, four or five substantially equally spaced stringers 138 are used, however, more or less can be used depending on the application. The stringers 138 run lengthwise along the plate 136 generally parallel to each other from the front side 102 towards the back side 104. The stringers 138 can have any cross-sectional shape along their length that is known to strengthen the plate 136. In this example, a C-channel is shown, however, other shapes such as an L-beam or an I-beam can also be used.

The deck can be rotated about the hinge pins 120 from the cross traffic position shown in FIG. 6 to the below dock position shown in FIG. 7, or to an above dock position not shown. In keeping with an aspect of this invention, the deck 108 includes a constant radius hinge assembly 140 that pivotly connects the deck 108 to the vertical uprights 114. The constant radius hinge assembly 140 of this example ensures that as the deck 108 is rotated up or down within its truck service range (again, ±6° angularity) about the hinge members 116 to a below dock position or above dock position, no edge is exposed and no projection is formed in the path of a forklift.

The constant radius hinge assembly 140 includes a header 142 fastened to the plate 136 and to the stringers 138. The header 142 includes a first portion 144 that is generally curved, a second portion 146 that is generally horizontal, and a third portion 148 that generally extends downward. The header 142 can extend the entire width W of the deck 108, and form an extension of plate 136 to provide structural support for the deck 108 towards the back side 104 of the dock leveling system 100. The first portion 144 has a constant radius and a center of curvature that is coincident with the center of rotation 122 of the hinge pins 120. The second portion 146 of the header 142 extends generally in the same plane as the plate 136. The stringers 138 can each be welded to the third downward extending portion 148 of the header 142.

The first portion 144 defines a point of highest elevation 150 of the header 142 when the deck 108 is in the cross-traffic position or in the below dock position. The point of highest elevation 150 defines an overall elevation 152 of the hinge assembly 140 when the deck 108 is in the cross traffic or below dock position. As will be understood, as the deck 108 is rotated to the below dock position, the point of highest elevation 150 tracks along the surface of the first portion 144, and further the overall elevation 152 remains constant.

The deck 108 can include a plurality of header lugs 154 disposed underneath the header 142, only one of which is shown in FIGS. 6 and 7. For each vertical upright 114, a header lug 154 can be disposed on each side of the respective vertical upright 114. Thus, in this example, there are a total of eight header lugs 154.

Each header lug 154 can include a crown 156, a body 158, and a foot 160. The crown 156 is rounded and has a receiving hole 162. The crown 156 can be welded to the first portion 144 of the header 142 and the foot 160 can be welded to the third portion 148 of the header 142. The header lugs 154 can be manufactured from ⅜" plate steel or other size steel based on the application. Accordingly, the header lugs 154 act to support the header 142.

The receiving holes 162 of each pair of header lugs 154 disposed on opposite sides of a vertical upright 114 encircle the respective single hinge pin 120 disposed in the receiving hole 118 of the respective vertical upright 114. In other words, the individual hinge pins 120 disposed in each respective vertical upright 114 extend through the receiving holes 162 of each pair of header lugs 154 disposed on opposite sides of the respective vertical upright 114, thereby forming the hinge between the frame structure 106 and the deck 108. Thus, in this example with a total of four vertical uprights 114, a total of eight header lugs 154 are used with a total of four hinge pins 120.

The hinge pins 120 can be free to rotate within the receiving holes 118, 162. To lower friction, bearings or a lubricant could be inserted into the receiving holes 118, 162. The hinge pins 120 can be held in place by a cotter pin or retaining clips or other structure known in the art.

The rear transition 124 defines an elevation 164 of the loading dock 112. Again, the deck 108 defines an overall elevation 152 in the cross traffic position. As the deck is lowered to the below dock position, the overall elevation 152 of the deck 108 remains constant. This is due to the first portion 144 of the header 142 having a constant radius and a center of curvature coincident with the center of rotation 122 of the deck 108. In this example, the overall elevation 152 of the deck 108 is approximately equal to the elevation 164 of the rear transition 124, and thus the front edge 134 of the plate 128 of the rear transition 124 is not exposed and no projection is created in the dock leveling system 100 when the deck 108 is in the below dock position as in the prior art.

Moreover, the distance between the rear transition 124 and the hinge assembly 140 can be minimized in the present example. A gap is defined as the absolute distance D3 between the front edge 134 of the rear transition 124 and the first portion 144 of the header 142. Because the first portion 144 has a constant radius and a center of curvature coincident with the center of rotation 122 of the deck 108, the absolute distance D3 remains constant through the lowering of the deck 108 to the below dock position. Further, because the front edge 134 of the plate 128 is near a front edge 166 of the first portion 144 of the header 142, the absolute distance D3 will remain constant as the deck 108 is moved within its operating range of 6° in the above dock position. Accordingly, the absolute distance D3 between the deck 108 and the rear transition 124 can be maintained at a very small distance as not to create a projection or expose an edge in the path 20 of a forklift while the deck 108 is at either elevation or in the stored position.

A second example of a dock leveling system 180 disposed in a loading dock 182 is shown in FIGS. 8 and 9 and also includes a constant radius hinge assembly that ensures that no edge is exposed or projection is formed in the path of a forklift when the deck is in any position between the above dock and below dock truck service range.

The second example of the dock leveling system 180 includes a front side (not shown) and a back side 184. The front side can be similar to prior art dock leveling systems. The dock leveling system 180 includes a frame structure 186 and a deck 188 hingedly attached to the frame structure 186.

The frame structure 186 for this example is similar to the first example. The frame structure 186 includes a plurality of vertical uprights 190, with a hinge member 192 disposed on each vertical upright 190. Each hinge member 192 includes a receiving hole 194, and a hinge pin 196 is disposed through each receiving hole 194. In this example, the deck 188 also includes a plate 198 and a plurality of stringers 200. Each stringer 200 has an end 202 and a side surface 204.

The deck 188 further includes a constant radius hinge assembly 206 that ensures that no projection or exposed edge is formed in the dock leveling assembly 180 when the deck 188 is within the truck service range in any position between the above dock position or the below dock position. The constant radius hinge assembly 206 includes a header 208 disposed along the width of the deck 188 that provides support to the deck 188 similar to the first example. The header 208 includes a first portion 210 that is curved and a second portion 212 that is generally planar. The first portion 210 is similar to the first portion 144 of the first example. The second portion 212 angles generally downward and includes a plurality of slots (not shown), the number of which is equal to at least the number of stringers 200. The stringers 200 extend into the slots of the second portion 212 of the header 208, such that each stringer 200 is sandwiched within the slots of the header 208. The stringers 200 and the header 208 are then welded together.

A header lug 214 can be disposed on each side of a respective vertical upright 190 as in the first example. Each header lug 214 includes a crown 216, a body 218, and a foot 220. However, in this example, each foot 220 and body 218 of the lugs 214 extend past each respective end 202 of a stringer 200 and the side surface 204 of a respective stringer 200. The second portion 212 of the header 208 is disposed directly on the body 218 of each lug 214 for attachment of one to the other.

The frame structure 186 can include a rear transition 222 that defines an elevation 224. The first portion 210 of the header 208 defines a point of highest elevation 226 for the constant radius hinge assembly 206, and defines an overall height 228 for the constant radius hinge assembly 206.

In this example, the second portion 212 does not extend horizontally as in the first example, but extends generally angled downward. As such, the first portion 210 curves both down towards the back side 184 of the dock leveling assembly 180 as in the first example, but also the second portion 212 curves down towards front side of the dock leveling assembly 180.

As the deck 188 is rotated about a center of rotation 230 defined by the hinge pins 196, and is lowered to the below dock position, the overall elevation 228 of the deck 188 remains constant. This is due to the first portion 210 of the header 208 having a constant radius and a center of curvature coincident with the center of rotation 230 of the deck 188. In this example, the overall elevation 228 of the constant radius hinge assembly 206 is approximately equal to the elevation 224 of the rear transition 222, and thus no projection is created and no edge is exposed in the dock leveling system 180 when the deck 188 is in the below dock position.

Further, because the first portion 210 curves down toward the front of the dock leveling assembly 180, no projection is created when the deck 188 is rotated to the above dock position. As will be understood, as the deck 188 is rotated about the hinge pins 196, the point of highest elevation 226 for the constant radius hinge assembly 206 tracks along the first portion 210 towards the deck 188. Thus, the overall elevation 228 of the hinge assembly 206 stays constant while the deck 188 is rotated to the above dock position as well.

Moreover, the distance between the rear transition 222 and the hinge assembly 206 can again be minimized in the present example. An absolute distance D4 is defined as that distance between a front edge 232 of the rear transition 222 and the first portion 210 of the header 208. Because the first portion 210 has a constant radius and a center of curvature coincident with the center of rotation 230 of the deck 188, the absolute distance D4 remains constant through the lowering of the deck 188 to the below dock position and the raising of the deck to the above dock position. Accordingly, the absolute distance D4 between the deck 188 and the rear transition 222 can be maintained to a very small distance.

Thus, no projection or exposed edge is formed in the path of a forklift while the deck 188 is in any position in the truck service range in a below dock position or an above dock position. Further, the absolute distance D4 between the header 208 and the rear transition 222 is constant when the deck 188 is located within at least the truck service range.

A third example of a dock leveling system 250 disposed in a loading dock 252 is shown in FIGS. 10 and 11 and also includes a constant radius hinge assembly that, like the previous two examples, ensures that no projection or exposed edge is formed in the path of a forklift when the deck is within the truck service range.

The dock leveling system 250 includes a front side (not shown) and a back side 254. The dock leveling system 250 includes a frame structure 256 and a deck 258. The frame structure 256 includes a plurality of vertical uprights 260 that each include a shoulder 262 extending towards the front side of the dock leveling system 250. The shoulder 262 defines a hinge member and includes a surface 264 that defines a hinge pin receiving area. A hinge pin 266 is fixed in the hinge pin receiving area 264 and defines a center of rotation 268 of the deck 258 about the frame structure 256. In this example, the hinge pin 266 can extend the full width of the dock leveling system 250.

A rear transition 270 with a front edge 271 is affixed to the top of the vertical upright 260 and extends in the rear direction, cantilevered off the vertical upright 260. A reinforcement member 272 depicted as an L-shape can be placed to help support the rear transition 270. The rear transition 270 can be trimmed as in the first example.

The deck 258 includes a plate 274 and a plurality of stringers 276 extending down from the plate 274. The deck 258 further includes a constant radius hinge assembly 278 that provides support to the deck 258 similar to the previous examples. The hinge assembly 278 includes a header 280 attached to a rear end 282 of the stringers 276. The header 280 includes a curved portion 284, a first flat portion 286, and a second flat portion 288 separated from the first flat portion 286 by the curved portion 284. The header 280 wraps around the hinge pin 266 with the curved portion 284 bearing directly on the hinge pin 266. The curved portion 284 has a constant radius and a center of curvature that is coincident with the center of rotation 268. This creates the hinge by which the deck 258 can rotate relative to the frame structure 256. To reduce friction between the header 280 and the hinge pin 266, a bearing 290 or bushing can be placed around the hinge pin 266.

The first flat portion 286 of the header 280 includes a plurality of slots equal to at least the number of vertical uprights 260. The vertical uprights 260 are disposed in the slots to allow the header 280 to be disposed on and rotate about the hinge pin 266.

In this example, a lug need not be used. To ensure that the deck 258 does not lift off the hinge pin 266 during use, a plurality of removable fasteners 292 are placed through suitable holes in the first flat portion 286, passing under the hinge pin 266, and through suitable holes the second flat portion 288. This removably retains the deck 258 about the hinge pin 266 and the frame structure 256.

An absolute distance D5 is defined as that distance between the front edge 271 of the rear transition 270 and the curved portion 284 of the header 280. The curved portion further defines a height 294 of the header 280. The function of the constant radius hinge assembly 278 of the third example is similar to that of the second example. Thus, the height 294 remains constant while the deck 258 is in any position in the truck service range and no projection or exposed edge is formed in the path of a forklift. Further, the absolute distance D5 between the header 280 and the rear transition 270 is constant when the deck 258 is located within at least the truck service range.

A fourth example of a dock leveling system 300 disposed in a loading dock 302 is shown in FIG. 12 and also includes a constant radius hinge assembly that ensures that no projection or exposed edge is formed in the path of a forklift when the deck is in the truck service range.

The dock leveling system 300 includes a front side (not shown) and a back side 304. The dock leveling system 300 in this example also includes a frame structure 306 and a deck 308. The frame structure 306 in this example includes a plurality of vertical uprights 310 spaced along the width of the dock leveling system 300. On top of each of the vertical uprights 310 is a hinge member 312. In this example, each hinge member 312 is in the shape of a camel back and includes a receiving hole 314. A hinge pin 316 is disposed through the each receiving hole 314 as in the first two examples and defines a center of rotation 318 of the deck 308 about the frame structure 306.

The deck 308 in this example includes a plate 320 and a plurality of stringers 322 extending downward from the plate 320. The plate 320 includes a first curved portion 324 and a flat portion 326. The curved portion 324 extends towards the back side 304 off the stringers 322 and curves downward. The curved portion 324 has a constant radius and has a center of curvature coincident with the center of rotation 318.

A plurality of lugs 328 are disposed under the curved portion 324 of the plate 320. As in the previous examples, a lug 328 can be disposed on each side of a respective vertical upright 310. Each lug 328 has a crown 330 that is curved and can be welded to the bottom side of the curved portion 324. Each crown 330 has a receiving hole 332 disposed therein and receives the hinge pin 316. Each lug 328 can have a body 334 and a foot 336 and can be welded to the underside of plate 320 and/or the stringers 322.

In this example, the crown 330 of each of the lugs 328 is large enough such that the crown 330 extends out past the periphery of the hinge member 312. Thus, the curved portion 324 does not contact the hinge member 312 through any portion of the rotation of the deck 308. In this example, the curved portion 324 of the plate 320 extending past the stringers 322 and the lugs 328 providing structural support for the plate 320 obviates the need for a header.

The vertical uprights 310 can include a shoulder 340. A support member 342 in the shape of an L-bracket can be disposed along each of the shoulders 340 the width of the dock leveling system 300. A rear transition 344 with a leading edge 346 is disposed on the support member 342.

The curved portion 324 of the deck 308 defines a constant radius hinge assembly 338 in the fourth example. The dock leveling system 300 is similar to the dock leveling system 100 of the first example in that the constant radius hinge assembly 338 forms no projection or exposed edge is formed in the path of a forklift when the deck 308 is within the truck service range, and a distance D6 between the curved portion 324 and the leading edge 346 of the rear transition 344 remains constant when the deck 308 is in any position in the truck service range.

In addition to ensuring no projections or exposed edges are formed, the presently disclosed examples further improve upon the prior art by facilitating access and maintenance. More specifically, in each of the foregoing examples, the deck can be detached from the frame structure by rotating the deck upwards and removing the hinge pins from the hinge members, or removing the retaining fasteners as disclosed in the third example. The deck can then be removed and repairs or replacement can easily be performed on both the deck and the frame structure.

From the foregoing, one of ordinary skill in the art will appreciate that the present disclosure sets forth a constant radius hinge for a dock leveling system. However, one of ordinary skill in the art could readily apply the novel teachings of this disclosure to any number of hinged members. As such, the teachings of this disclosure shall not be considered to be limited to the specific examples disclosed herein, but to include all applications within the spirit and scope of the invention.

We claim:

1. A dock leveling system adapted to be disposed in a pit formed in a loading dock surface and adapted to provide a generally smooth transition between the dock leveling system and the loading dock surface, the dock leveling system comprising:
   a hinge member with a hinge pin receiving area;
   a hinge pin disposed in the hinge pin receiving area, wherein the hinge pin defines a center of rotation;
   a deck rotatable about the hinge pin between at least a lowered position, in which the deck is declined relative to horizontal, and an inclined position, in which the deck is inclined relative to horizontal;
   wherein the deck includes a plate and a header disposed adjacent to the plate, wherein the header has a curved portion with a constant radius and a center of curvature substantially co-axial to the center of rotation.

2. The system of claim 1, further comprising a vertical upright, wherein the hinge member is disposed on top of the vertical upright.

3. The system of claim 1, further comprising a gap defined between the curved portion and an edge defined by the loading dock surface and a plane substantially perpendicular thereto, wherein the gap maintains a constant dimension as the deck rotates about the hinge pin.

4. The system of claim 3, further comprising a rear transition connected to the vertical upright, wherein the rear transition defines the edge.

5. The system of claim 1, wherein the plate has an upper surface and the header forms an extension of the upper plate surface.

6. The system of claim 1, further comprising a lug rotatably mounted to the hinge pin, wherein the lug has a curved crown, and wherein the curved portion of the header is disposed on the crown of the lug.

7. The system of claim 6, wherein the header includes a second portion that is approximately co-planar with the plate.

8. The system of claim 7, wherein the second portion is connected to an end of the plate.

9. The system of claim 8, wherein the lug further comprises a foot opposite the crown, wherein the foot is connected to a third portion of the header.

10. The system of claim 7, further comprising a plurality of stringers extending down from the plate and extending the length of the plate, wherein the stringers extend into slots in a third portion of the header.

11. The system of claim 10, wherein the lug further includes a foot and a body between the crown and the foot, wherein the third portion is disposed on the body of the lug.

12. The system of claim 2, wherein the vertical upright includes a shoulder extending outward, and wherein the shoulder defines the hinge member and includes a surface that defines the hinge pin receiving area.

13. The system of claim 12, wherein the header includes a first portion and a second portion, and wherein the first portion and the second portion are on opposite sides of the curved portion.

14. The system of claim 13, wherein the first portion includes a slot, and wherein the vertical upright is disposed inside the slot in the first portion of the header.

15. The system of claim 1, further comprising a plurality of stringers extending down from the plate and extending the length of the plate, wherein the stringers extend into a plurality of slots formed in the header.

16. The system of claim 1, wherein the plate is connected to the curved portion.

17. A dock leveling system adapted to be disposed in a pit in a loading dock floor and adapted to provide a relatively smooth transition between the dock leveling system and the loading dock floor, the dock leveling system comprising:
   a hinge member with a hinge pin receiving area;
   a hinge pin disposed in the hinge pin receiving area, wherein the hinge pin defines a center of rotation;
   a deck rotatable about the hinge pin, wherein the deck has a curved portion with a constant radius and a center of curvature substantially co-axial to the center of rotation, the curved portion being substantially tangential to a plane coplanar to the loading dock floor, wherein the curved portion remains substantially tangential to the plane as the deck rotates about the hinge pin; and
   a plurality of lugs fastened to the curved portion, wherein at least two of the lugs are coupled to the curved portion to be rotatably coupled to the hinge pin and proximate to opposite sides of the hinge member.

18. The system of claim 17, further comprising a vertical upright, wherein the hinge member is disposed on top of the vertical upright.

19. The system of claim 18, further comprising a rear transition connected to the vertical upright, wherein the rear transition defines an edge opposite the curved portion.

20. The system of claim 17, wherein the deck includes a header and a plate connected to the header, wherein the header defines the curved portion of the deck.

21. The system of claim 20, wherein each lug has a curved crown, and wherein the curved portion of the header is disposed on the crown of each lug.

22. The system of claim 21, wherein the header includes a second portion, and a third portion, wherein the second portion is approximately co-planar with the plate.

23. The system of claim 22, wherein the second portion is connected to the end of the plate.

24. The system of claim 23, wherein each lug further comprises a foot opposite the crown, wherein the foot is connected to the third portion of the header.

25. The system of claim 20, further comprising a plurality of stringers extending down from the plate and extending the length of the plate, the header further comprising a third portion, wherein the stringers extend into slots in the third portion.

26. The system of claim 25, wherein each lug further includes a foot and a body between the crown and the foot, wherein the third portion is disposed on the body of each lug.

27. The system of claim 18, wherein the vertical upright includes a shoulder extending outward, and wherein the shoulder defines the hinge member and includes a surface that defines the hinge pin receiving area.

28. The system of claim 27, wherein the deck further includes a header, the header including the curved portion, a first portion and a second portion, and wherein the first portion and the second portion are on opposite sides of the curved portion.

29. The system of claim 28, wherein the first portion includes a slot, wherein the vertical upright is disposed inside the slot in the first portion of the header.

30. The system of claim 20, wherein the plate is connected to the curved portion.

31. A dock leveling system adapted to be disposed in a pit formed in a loading dock floor and adapted to help provide a substantially smooth transition for dock traffic traveling between the loading dock floor and the dock leveling system, the dock leveling system comprising:
   a hinge member with a hinge pin receiving area;
   a hinge pin disposed in the hinge pin receiving area, wherein the hinge pin defines a center of rotation;
   a deck including a plate having a first surface and a header disposed adjacent to the plate to provide a second surface that extends the first surface and a plurality of lugs fastened to the header, wherein the lugs each include a receiving hole and are rotatably disposed about the respective hinge pins;
   wherein the header includes a curved portion with a center of curvature substantially co-axial to the center of rotation and the curved portion maintains a height substantially similar to an elevation of the loading dock floor as the deck rotates about the hinge pin.

32. A dock leveling system adapted to be disposed in a pit formed in a loading dock floor, the dock leveling system comprising:
   a hinge member with a hinge pin receiving area;
   a hinge pin disposed in the hinge pin receiving area, wherein the hinge pin defines a center of rotation; and
   a deck rotatable about the hinge pin between at least a lowered position, in which the deck is declined relative to the loading dock floor, and a raised position, in which the deck is inclined relative to the loading dock floor;
   wherein the deck includes a plate having an upper surface and a header disposed adjacent to the plate, wherein the header forms an extension of the upper plate surface to help provide structural support for the deck.

33. The system of claim 32, wherein the header has a curved portion with a constant radius and a center of curvature substantially co-axial to the center of rotation.

34. A rear header for a pit-style dock leveler intended to help provide a smoother transition between a loading dock surface and the dock leveler, the dock leveler including a hinge member with a hinge pin receiving area, a hinge pin disposed in the hinge pin receiving area and defining an axis of rotation, and a deck including a plate and being rotatable about the hinge pin, the rear header comprising:

a structural member adapted to be coupled to the deck adjacent the plate to form an extension thereof, wherein the structural member includes a curved portion with a constant radius and an axis of curvature that is adapted to be substantially co-axial to the axis of rotation, wherein the curved portion is adapted to be substantially tangential to the plate.

35. A dock leveler adapted to be disposed in a pit formed in a loading dock surface, the dock leveler comprising:

a hinge member with a hinge pin receiving area;

a hinge pin disposed in the hinge pin receiving area, wherein the hinge pin defines a center of rotation;

a deck rotatable about the hinge pin, wherein the deck includes a plate and a header disposed adjacent to the plate, wherein the header has a curved portion with a constant radius and a center of curvature substantially co-axial to the center of rotation, the curved portion helping to provide a smooth transition between the loading dock surface and the deck; and an extension lip pivotally coupled to the deck.

36. The dock leveler of claim 35, further comprising a plurality of stringers extending down from the plate and extending the length of the plate, wherein the stringers are attached to a portion of the header.

37. A dock leveler adapted to move between a stored position, an inclined position, and a declined position, the dock leveler adapted to be disposed in a pit formed in a loading dock surface, and the dock leveler adapted to minimize any projection of the leveler above the loading dock surface when the dock leveler is in the declined position, the dock leveler comprising:

a hinge member with a hinge pin receiving area;

a hinge pin disposed in the hinge pin receiving area, wherein the hinge pin defines a center of rotation;

a deck rotatable about the hinge pin, wherein the deck includes a plate and a header disposed adjacent to the plate, wherein the header has a curved portion that is substantially tangential to the plate and the curved portion has a constant radius and a center of curvature substantially co-axial to the center of rotation.

38. The dock leveler of claim 37, further comprising a plurality of stringers extending down from the plate and extending the length of the plate, wherein the stringers extend into a plurality of slots formed in the header.

* * * * *